(12) United States Patent
Czajkowski

(10) Patent No.: US 8,013,578 B2
(45) Date of Patent: Sep. 6, 2011

(54) ALTERNATOR

(75) Inventor: François Czajkowski, Linars (FR)

(73) Assignee: Moteurs Leroy-Somer, Angouleme (FR)

( * ) Notice: Subject to any disclaimer, the term of this patent is extended or adjusted under 35 U.S.C. 154(b) by 671 days.

(21) Appl. No.: 12/084,125

(22) PCT Filed: Oct. 24, 2006

(86) PCT No.: PCT/FR2006/051101
§ 371 (c)(1),
(2), (4) Date: Jun. 17, 2008

(87) PCT Pub. No.: WO2007/051939
PCT Pub. Date: May 10, 2007

(65) Prior Publication Data
US 2009/0153105 A1    Jun. 18, 2009

(30) Foreign Application Priority Data
Nov. 4, 2005   (FR) ...................................... 05 11264

(51) Int. Cl.
*F02N 11/08* (2006.01)
(52) U.S. Cl. ................................. 322/28; 322/29; 322/37
(58) Field of Classification Search .................... 322/22, 322/23, 28, 29, 37, 59, 89, 25, 27
See application file for complete search history.

(56) References Cited

U.S. PATENT DOCUMENTS

| | | | |
|---|---|---|---|
| 3,656,051 A | 4/1972 | Pratt | |
| 3,809,914 A * | 5/1974 | Kilgore et al. | 290/38 R |
| 4,121,148 A | 10/1978 | Platzer | |
| 4,152,636 A * | 5/1979 | Gorden | 322/25 |
| 4,453,120 A | 6/1984 | Bauer | |
| 4,686,375 A * | 8/1987 | Gottfried | 290/2 |
| 4,841,216 A * | 6/1989 | Okada et al. | 322/10 |
| 5,493,200 A * | 2/1996 | Rozman et al. | 322/10 |
| 5,512,811 A * | 4/1996 | Latos et al. | 322/10 |
| 5,594,322 A * | 1/1997 | Rozman et al. | 322/10 |
| 5,783,891 A | 7/1998 | Auinger et al. | |
| 5,920,162 A * | 7/1999 | Hanson et al. | 318/400.04 |
| 6,462,429 B1 * | 10/2002 | Dhyanchand et al. | 290/31 |
| 6,844,707 B1 * | 1/2005 | Raad | 322/29 |
| 6,995,478 B2 * | 2/2006 | Xu et al. | 290/52 |
| 7,078,826 B2 * | 7/2006 | Xu et al. | 290/52 |
| 7,388,300 B2 * | 6/2008 | Anghel et al. | 290/39 |

FOREIGN PATENT DOCUMENTS

EP          0 233 425 A1    8/1987

* cited by examiner

*Primary Examiner* — Nicholas Ponomarenko
(74) *Attorney, Agent, or Firm* — Oliff & Berridge, PLC

(57) ABSTRACT

The present invention relates to an alternator comprising:
an alternator stator (2) comprising a main secondary winding (7) delivering an output voltage; at least one auxiliary winding (3); and an exciter field winding (5) powered by the auxiliary winding(s);
a regulator (20) for regulating the output voltage of the alternator; and an alternator rotor (8) comprising an exciter secondary winding (6); a rotary field winding (4) powered by the exciter secondary winding (6); and a control circuit (10) for controlling the power supply to the rotary field winding (4) and configured to maintain the amplitude of the output voltage from the alternator at a predetermined level by controlling the power supply to the rotary field winding (4) in response to a control signal coming from the voltage regulator (20), the auxiliary winding(s) (3) generating a voltage because they are exposed to a varying magnetic field generated by the rotary field winding (4) in rotation.

Figure 1:
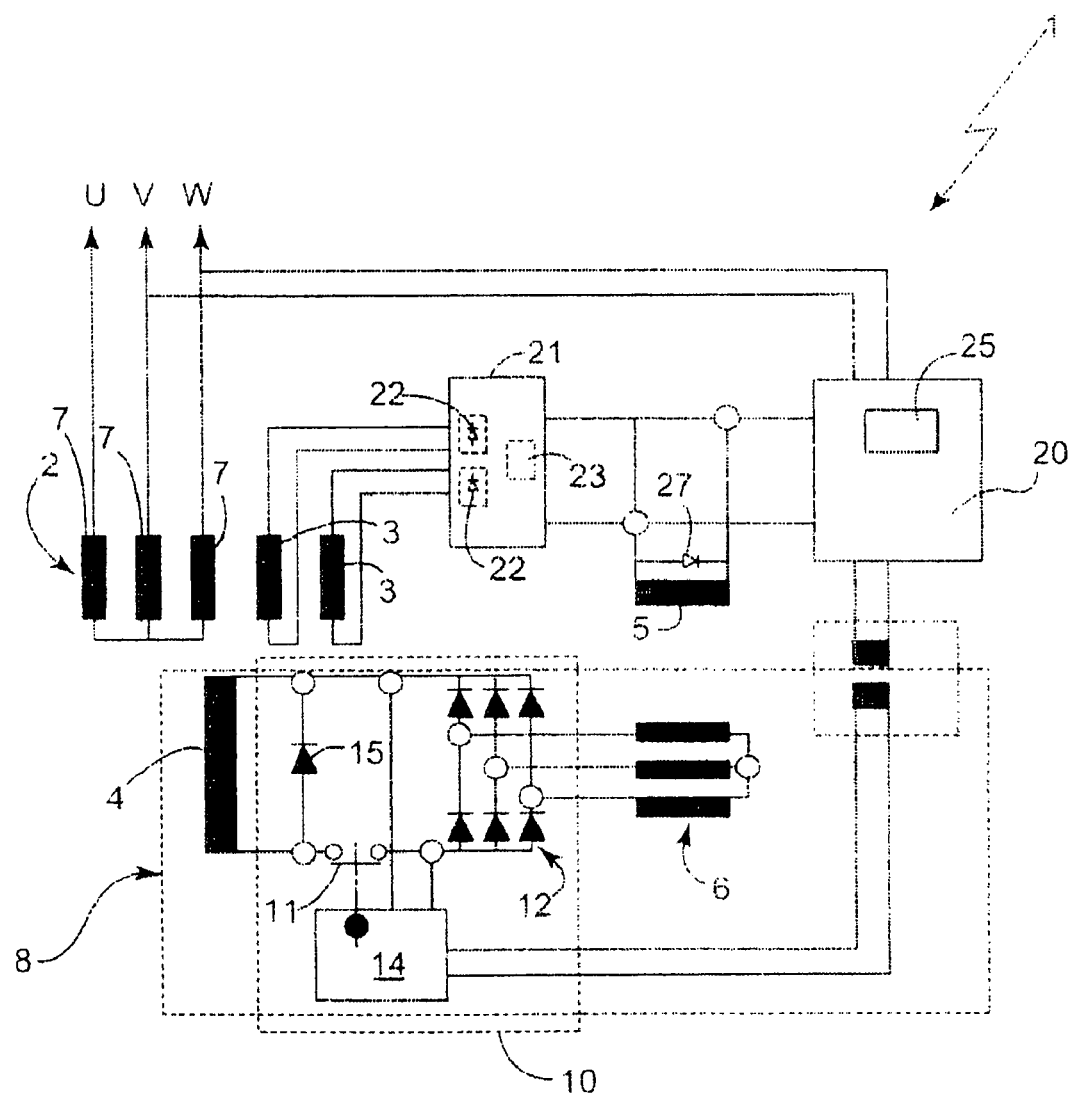

11 Claims, 1 Drawing Sheet

ALTERNATOR

The present invention relates in general to producing single- or polyphase alternating current (AC), e.g. three-phase AC, by means of an alternator comprising a rotor that is driven in rotation by an engine, for example, and the invention relates more particularly to regulating such alternators.

In known manner, an alternator comprises an exciter field (or primary) winding powered with a variable amount of current so as to induce AC in an exciter secondary (or armature) winding, which AC is subsequently rectified by a rectifier bridge to power the main field winding of the alternator with rectified direct current (DC). That makes it possible to avoid having rings and brushes between the rotary and stationary portions of the alternator.

An alternator is traditionally controlled by means of a voltage regulator detecting variations in the output voltage from the alternator, where variations can be due to variations in the load on the alternator.

The regulator modifies the current flowing in the exciter field winding in a loop for regulating the output voltage from the alternator.

The response time of the regulation loop can be relatively long, particularly as the result of the response time of the voltage regulator and as a result of the electrical and mechanical time constants of the exciter and of the alternator.

U.S. Pat. Nos. 3,656,051 and 4,453,120 disclose alternators each comprising a rotary control circuit disposed between the exciter secondary winding and the main field winding of the alternator, the control circuit being configured to maintain the output voltage from the alternator at a predetermined level by controlling the current flowing in the alternator rotor in response to a control signal received from a comparator circuit.

Those alternators comprise exciters with field permanent magnets or having a single winding powered by a battery.

Those alternators present the drawback of relatively large exciter costs and size, in particular when using permanent magnet exciters, or else of being dependent on a battery and a system for charging it.

There thus exists a need to have an alternator presenting reduced size and manufacturing cost.

European patent application EP-A1-0 233 425 discloses a regulator device for an alternator without rings or brushes in which the circuit for powering the excitation field winding comprises auxiliary windings for picking up the fundamental and third-harmonic voltages of the alternator, and an excitation current regulator member controlled firstly as a function of the fundamental and third-harmonic voltages, and secondly as a function of the output voltage from the alternator.

In that application, the exciter field winding is powered with current that is varied by means of the voltage regulator, which can lead to delays in the response of the alternator and to greater variations in transient voltage. If there is a variation in load, the current variation in the exciter field winding is delayed by the time constant of the field winding. The resulting variation in the voltage at the terminals of the alternator is greater than the variation that would have occurred without an exciter.

There therefore exists a need to benefit from an alternator having a faster response time in the event of a variation in load so as to improve its behavior under transient conditions, and in particular so as to enable transient voltage variations to be decreased.

The invention seeks to satisfy the above-mentioned requirements in full or in part.

The invention achieves this by means of an alternator comprising:
an alternator stator comprising:
a main secondary winding delivering an output voltage;
at least one auxiliary winding; and
an exciter field winding powered by the auxiliary winding(s);
a regulator for regulating the output voltage of the alternator; and
an alternator rotor comprising:
an exciter secondary winding;
a rotary field winding powered by the exciter secondary winding; and
a control circuit for controlling the power supply to the rotary field winding and configured to maintain the amplitude of the output voltage from the alternator at a predetermined level by controlling the power supply to the rotary field winding in response to a control signal coming from the voltage regulator, the auxiliary winding(s) generating a voltage because they are exposed to a varying magnetic field generated by the rotary field winding in rotation.

Independently and in combination with the above, the invention also provides an alternator comprising:
an alternator stator comprising:
a main secondary winding delivering an output voltage;
at least one auxiliary winding; and
an exciter field winding powered by the auxiliary winding(s) via at least one rectifier bridge;
a regulator for regulating the output voltage from the alternator; and
an alternator rotor comprising:
an exciter secondary winding; and
a rotary field winding powered by the exciter secondary winding.

According to an aspect of the invention, the exciter field winding is not powered by a battery and is also different from a permanent magnet field, thereby making it possible to reduce the cost of the alternator.

Advantageously, the exciter field winding is powered in a manner that does not depend on the main secondary winding, and in particular on the output voltage from the alternator, specifically because the power supply to the exciter field winding is not controlled by the voltage regulator.

The use of stator auxiliary windings makes it possible to deliver the excitation voltage to the exciter. The exciter field winding is powered by means of the auxiliary winding(s) that deliver(s) sufficient current under all operating conditions of the alternator.

The invention also enables regulation to be faster, given that controlling the excitation current of the rotating field winding makes it possible to reduce the delay due to the exciter.

The exciter field winding may be powered with DC by the auxiliary winding(s).

The alternator may comprise a plurality of auxiliary windings, e.g. two auxiliary windings.

The control circuit may comprise a rectifier, e.g. a rectifier bridge, enabling the AC voltage of the exciter secondary winding to be transformed into a rectified DC voltage for powering the rotary field winding.

The control device may comprise an electronic switch between the rotary field winding and the exciter secondary winding, which switch is controlled as a function of the control signal. The electronic switch may be a static component, for example.

The control circuit may be arranged to control the electronic switch using a pulse width modulation mode.

The control circuit may comprise a freewheel diode connected to the terminals of the rotary field winding.

The voltage regulator may comprise a digital processor unit arranged to monitor the output voltage and to generate the control signal as a function of the output voltage, in particular as a function of the frequency, the integral, and the derivative of the frequency of the output voltage and as a function of the amplitude, the integral, and the derivative of the amplitude of the output voltage.

The control signal may be transmitted from the voltage regulator to the control circuit via an inductive connection, in particular a low frequency connection, via an optical connection, in particular an infrared connection, or by emitting electromagnetic waves, in particular at high frequency or very high frequency.

The alternator may comprise at least one rectifier for rectifying an AC voltage generated by at least one auxiliary winding into a rectified DC voltage powering the exciter field winding. The rectified voltage may also power the voltage regulator.

The exciter field winding may be powered using pulse width modulation so as to limit the current in the exciter field winding.

The main winding of the stator may output a three-phase voltage.

The invention also provides an electricity generator set including an alternator as defined above. By way of example, the generator set may also comprise a heat engine.

The invention can be better understood on reading the following detailed description of an embodiment of the invention and on examining the accompanying drawing, in which FIG. 1 is a schematic diagram of an alternator made in accordance with the invention.

The alternator 1 shown in FIG. 1 comprises an alternator stator 2 including a main stator secondary winding 7 delivering an output voltage, e.g. a three-phase voltage, with the three phases being referenced U, V, and W.

Each phase may include one or more windings.

The stator 2 also includes auxiliary windings 3 that perform a function described below.

The alternator also includes an alternator rotor 8 having a rotary field winding 4 disposed on the shaft of the machine, the shaft being driven for example by an engine (not shown).

The auxiliary windings 3 generate a voltage because they are exposed to the varying magnetic field generated by the rotating field winding and the reaction of the stator secondary winding.

The alternator 1 includes an exciter comprising firstly a stationary exciter field winding 5 powered by the auxiliary windings 3, and secondly an exciter secondary winding 6.

The rotary field winding 4 is powered by the exciter secondary winding 6 via a control circuit 10 that is configured to maintain the amplitude of the output voltage from the alternator at a predetermined level by controlling the power supply to the rotary field winding in response to a control signal coming from a voltage of regulator 20 of the alternator.

In the example described, the alternator has two stator auxiliary windings 3.

The exciter field winding 5 may be powered by a rectified voltage from the auxiliary windings 3, e.g. via a rectifier 21. The rectifier comprises two single-phase rectifier bridges 22 connected in parallel on the rectified side, each associated with one of the auxiliary windings 3. The rectifier 21 may include a current limiter system 23, e.g. of the pulse width modulation type, using one or more static switches, e.g. insulated gate bipolar transistors (IGBTs). A freewheel diode 27 is connected to the terminals of the exciter field winding 5.

The function of the current limiter system is to set an excitation ceiling, thereby reducing thermal drift due to the exciter field winding heating up. By way of example, this excitation ceiling is adjustable. The excitation current that needs to be delivered varies as a function of the fundamental and the third-harmonic voltages generated in the auxiliary windings 3, and it is limited to the adjustable ceiling.

The current limiter system 23 and the voltage regulator 20 may be located in the same housing, for example.

The voltage regulator 20 may be powered by the rectified voltage at the output from the rectifier 21.

The voltage regulator 20 generates a control signal that is transmitted from the stator 2 to the rotor 8 and then processed in the control circuit 10 for controlling the excitation current of the rotary field winding 4.

The voltage regulator 20 may, for example, include a digital processor unit 25 that can be arranged to monitor the output voltage from the alternator, e.g. between two phases, and to generate the control signal as a function of the output voltage, and in particular as a function of the values of the frequency, of the integral of the frequency, and of the derivative of the frequency of the output voltage and as a function of the amplitude, the integral, and the derivative of the amplitude of the output voltage.

The digital processor unit 25 may be arranged to implement a proportional integral derivative (PID) type regulation strategy on the amplitude and the frequency of the output voltage signal, subordinated to logical selections that depend on calculated values compared with reference levels. By way of example, the digital processor unit 25 may comprise one or more logic circuits, e.g. one or more microprocessors or microcontrollers.

To control the excitation of the rotary field winding 4, the control signal is transmitted from the stationary portion of the alternator to its rotary portion. Transmission may take place, for example, via an inductive connection, or by emitting electromagnetic waves, or indeed via an optical connection, and in particular an opto-electronic connection.

The control signal can be received and shaped by the control circuit 10, which is itself powered for example by the exciter secondary winding 6.

The control circuit 10 may include a rectifier bridge 12 serving to transform the multiphase AC from the exciter secondary winding 6 into rectified DC for powering the rotary field winding 4.

The control circuit 10 controls an electronic switch 11 which may have one or more components, e.g. at least one semiconductor electronic switch, e.g. an IGBT.

The control signal may include at least information that varies between a minimum and a maximum. By way of example the minimum may correspond to zero current, the switch 11 being continuously open, and the maximum may correspond to the switch 11 being continuously closed.

The relationship for controlling the switch 11 as a function of the control signal need not be linear. The electronic switch 11 may be controlled using a variable pulse width modulation mode.

By way of example, the control circuit 10 may include for this purpose a pulse width modulated type chopper system 14.

A freewheel diode 15 can be connected to the terminals of the rotary field winding 4.

The invention applies in particular to all alternators forming part of electricity generator sets, whatever their application.

The term "comprising a" should be understood as being synonymous with "comprising at least one" unless specified to the contrary.

The invention claimed is:

1. An alternator comprising:
   an alternator stator comprising:
   a main secondary winding delivering an output voltage;
   at least one auxiliary winding; and
   an exciter field winding powered by the auxiliary winding(s);
   a regulator for regulating the output voltage of the alternator; and
   an alternator rotor comprising:
   an exciter secondary winding;
   a rotary field winding powered by the exciter secondary winding; and
   a control circuit for controlling the power supply to the rotary field winding and configured to maintain the amplitude of the output voltage from the alternator at a predetermined level by controlling the power supply to the rotary field winding in response to a control signal coming from the voltage regulator, the auxiliary winding(s) generating a voltage because they are exposed to a varying magnetic field generated by the rotary field winding in rotation.

2. An alternator according to claim 1, comprising at least one rectifier for rectifying an alternating voltage generated by at least one auxiliary winding into a rectified voltage powering the exciter field winding.

3. An alternator according to claim 1, comprising two auxiliary windings.

4. An alternator according to claim 1, wherein the control circuit comprises a rectifier enabling an alternating voltage from the exciter secondary winding to be transformed into a rectified voltage for powering the rotary field winding.

5. An alternator according to claim 1, wherein the control device comprises an electronic switch between the rotary field winding and the exciter secondary winding, which switch is controlled as a function of the control signal.

6. An alternator according to claim 5, the control circuit being arranged to control the electronic switch using a pulse width modulation mode.

7. An alternator according to claim 1, wherein the voltage regulator comprises a digital processor unit arranged to monitor the output voltage and to generate the control signal as a function of the output voltage.

8. An alternator according to claim 1, wherein the control signal is transmitted from the voltage regulator to the control circuit by inductive coupling, by a radiofrequency signal, or by an optical connection.

9. An alternator according to claim 2, wherein the rectified voltage powers the voltage regulator.

10. An alternator according to claim 1, wherein the output voltage is a three-phase voltage.

11. An alternator according to claim 7, wherein the control signal is a function of the frequency, the integral, and the derivative of the frequency of the output voltage and as a function of the amplitude, the integral, and the derivative of the amplitude of the output voltage.

* * * * *